United States Patent [19]

Rath et al.

[11] 3,762,511
[45] Oct. 2, 1973

[54] MECHANICAL COUPLINGS

[75] Inventors: Heinrich Bernhard Rath, Koblenz-Lutzel; Manfred Kaub, Rhens/Rhein; Hermann Brix, Bassenheim, all of Germany

[73] Assignee: Girling Limited, Birmingham, England

[22] Filed: Jan. 19, 1971

[21] Appl. No.: 107,779

[30] Foreign Application Priority Data
Jan. 30, 1970 Great Britain..................... 4,456/70

[52] U.S. Cl.......................... 188/79.5 P, 188/196 B
[51] Int. Cl............................................ F16d 65/54
[58] Field of Search............... 188/79.5 P, 79.5 GT, 188/106 A, 106 F, 196 B, 217

[56] References Cited
UNITED STATES PATENTS
1,825,555  9/1931  Stern........................... 188/197 B X
2,292,017  8/1942  Smith.......................... 188/106 A X
3,339,678  9/1967  Burnett........................ 188/196 B X FOREIGN PATENTS OR APPLICATIONS
1,151,191  7/1963  Germany....................... 188/79.5 P
638,960    6/1950  Great Britain................. 188/196 B Primary Examiner—Duane A. Reger
Attorney—Scrivener, Parker, Scrivener & Clarke

[57] ABSTRACT

A brake operating mechanism has a strut or stay member pivotal at one end to one of two opposed friction elements about an axis perpendicular to the axis of rotation of the braked part and at the other end is stepped for engagement with the other friction element. The member is biassed to operate in ratchet-like manner so that progressively sized steps engage with the other element to increase the effective length of the member to give wear compensation. The steps are of ratchet like form with a steep rise followed by a decline, the decline giving running clearance. The strut or stay member can comprise two parts operating in the same sense or in scissor-like manner to give "half-step" adjustment. An auxiliary brake actuating means can comprise a lever acting to increase the effective width of a web.

12 Claims, 6 Drawing Figures

-FIG. 2.-

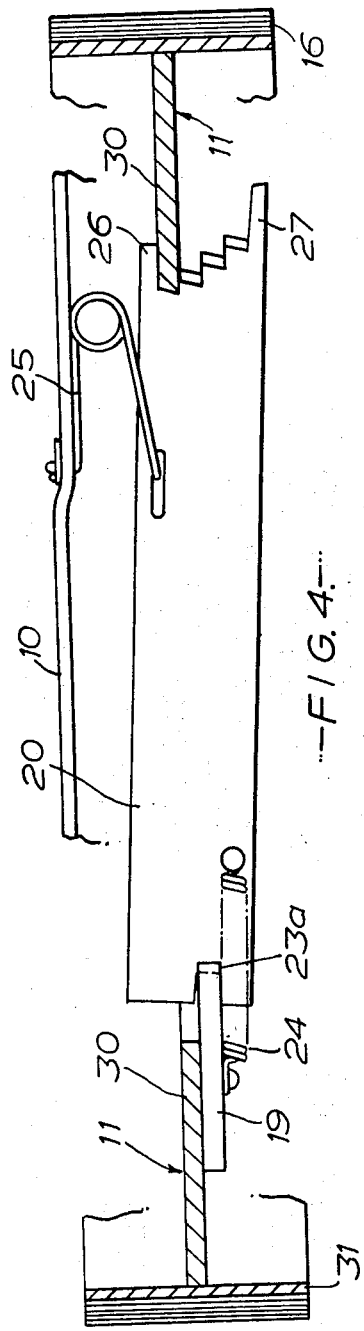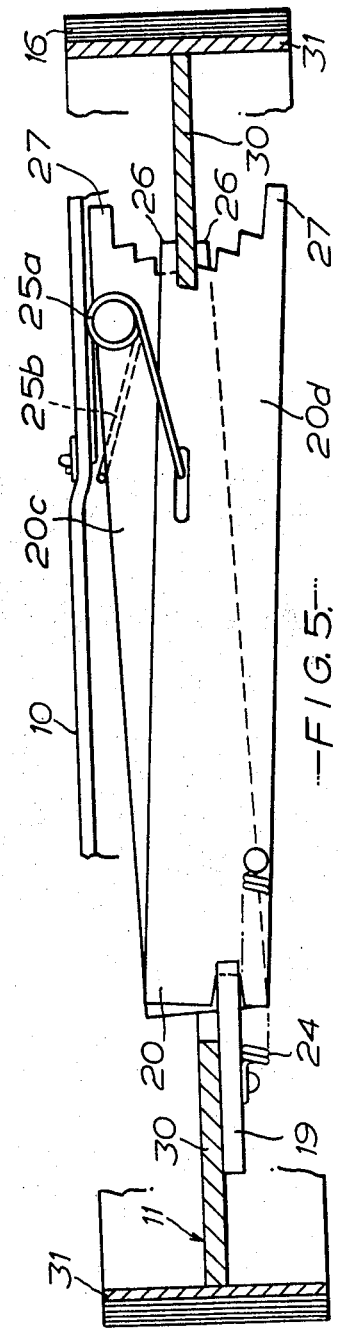

MECHANICAL COUPLINGS

BACKGROUND OF THE INVENTION

The present invention concerns an operating mechanism for a mechanical coupling wherein opposed friction elements carried on a mounting part are urged against another part which is rotational relative to the mounting part and particularly concerns vehicle brakes.

There are two main ypes of vehicle brakes: the internal shoe drum brake and the disc brake. In both, friction elements carried on a fixed mounting part are urged into contact with a rotor by an actuator against a return bias. It is desirable to provide automatic adjustment for wear of the friction elements and this can be achieved by using an adjustable length strut or stay member to limit the amount of retraction of the friction elements from the rotor and to arrange that the length is automatically adjusted when the actuator moves the friction elements. A system using a strut or stay member in an internal shoe brake has been proposed in which system the strut or stay member was pivotal on one friction element about an axis parallel to the rotational axis of the rotor and was spring biassed for movement from a smaller step to a larger step formed on the web of another friction element.

SUMMARY OF THE INVENTION

According to the present invention there is provided an operating mechanism for a mechanical coupling wherein opposed friction elements on a mounting part are urged against another part which is rotational relative to the mounting part, the mechanism comprising
 a. a mounting part,
 b. the opposed friction elements carried from said mounting part,
 c. an actuator mounted on the mounting part for urging the friction elements against said other part,
 d. return bias means for biassing the friction elements away from said other part,
 e. a member pivotally mounted about one of its ends on one of said elements about an axis which is substantially perpendicular to the axis of rotation of said other part, the other end of said member engaging the other element and having steps in its end profile, and
 f. bias means urging the member so that the steps of said profile progressively engage said other element so as to increase the effective length of said member.

The main advantages of this invention derive from the member being pivotal about an axis perpendicular to the axis of rotation. This permits the steps to be formed on the member rather than one of the friction elements and thus standard friction elements can be used and also there is less industrial wastage since it is easier to profile the rather simple member than the more complex friction elements (brake shoes for example are often castings).

Most vehicle brakes have an auxiliary brake-actuating means as well as a main service actuator. In internal shoe drum brakes, the friction elements are normally webbed shoes and the member may be disposed between the two webs; the auxiliary brake actuating means has therefore merely to widen the effective web of one of the elements for auxiliary braking effort to be transmitted to both shoes. The effective widening can be achieved by providing the shoe with a pivotal lever, which is suitably actuated, and having the member pivotal on, or engaging with its stepped end profile, the lever.

It is of course desirable not to increase the length of said member to such an extent that the friction elements cannot free themselves from the other part. This is readily achieved by a suitable end profile. By making each rise rather larger than the intended step and subsequently reducing the height of the step, it is possible to ensure that a step cannot be engaged with an element unless there is sufficient clearance between the friction elements and the other part.

Embodiments of the invention will now be described, by way of example, with reference to the accompanying drawings.

THE DRAWINGS

FIG. 4 is a view similar to FIG. 2 showing a variant thereof,

FIG. 5 is also a view similar to FIG. 2 showing yet another variant, and

DESCRIPTION OF EMBODIMENTS

Figure 1:
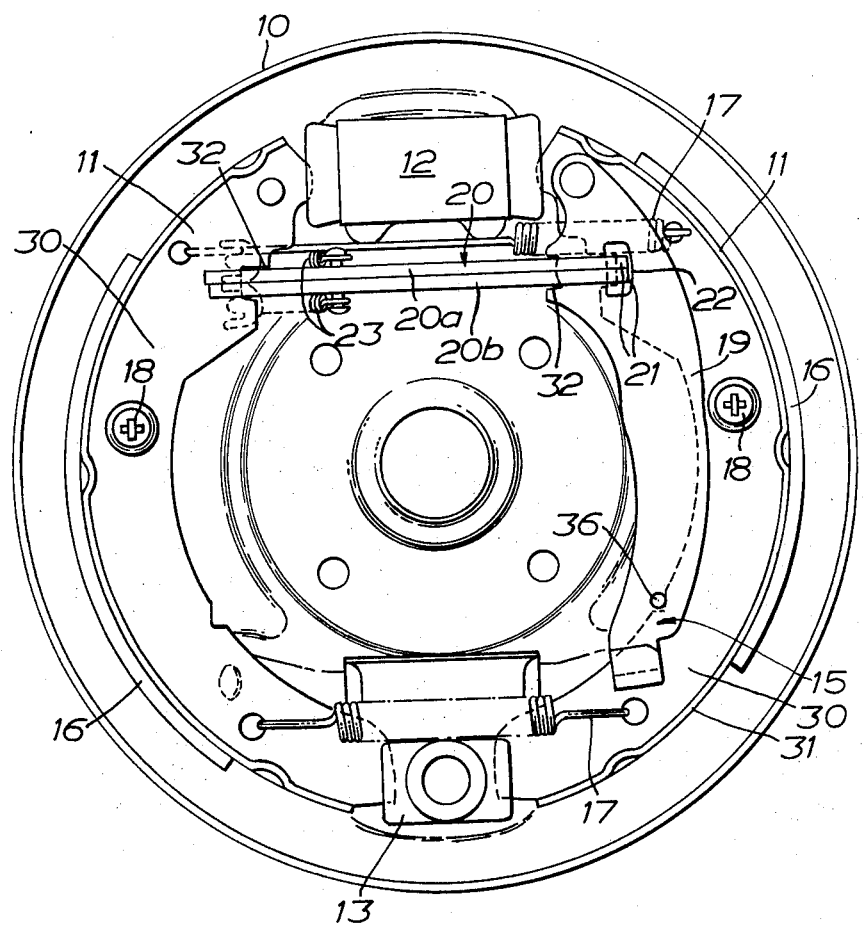
FIG. 1 is a face view on an operating mechanism for a drum brake.
Figure 2:
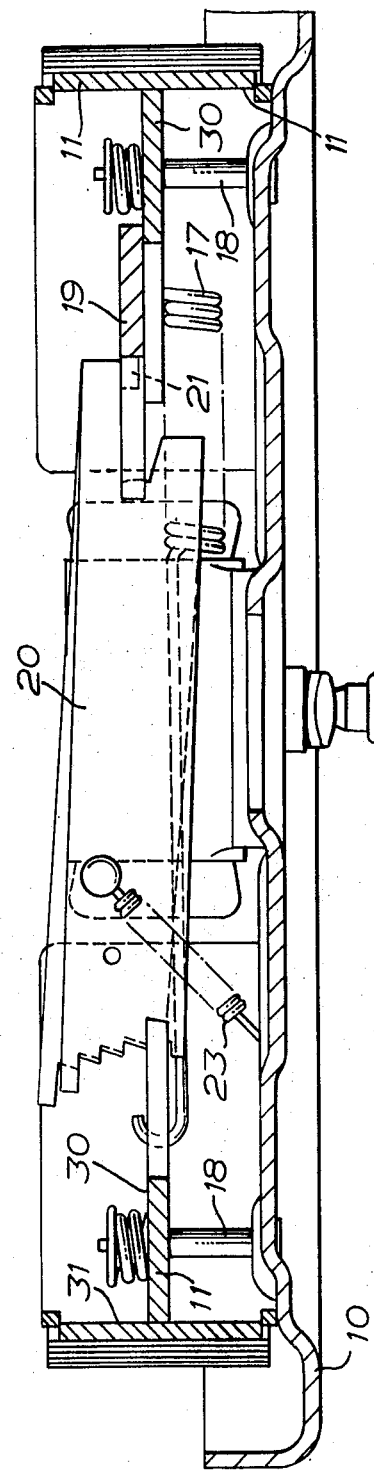
FIG. 2 is a section along line A—A of FIG. 1.
Figure 3:
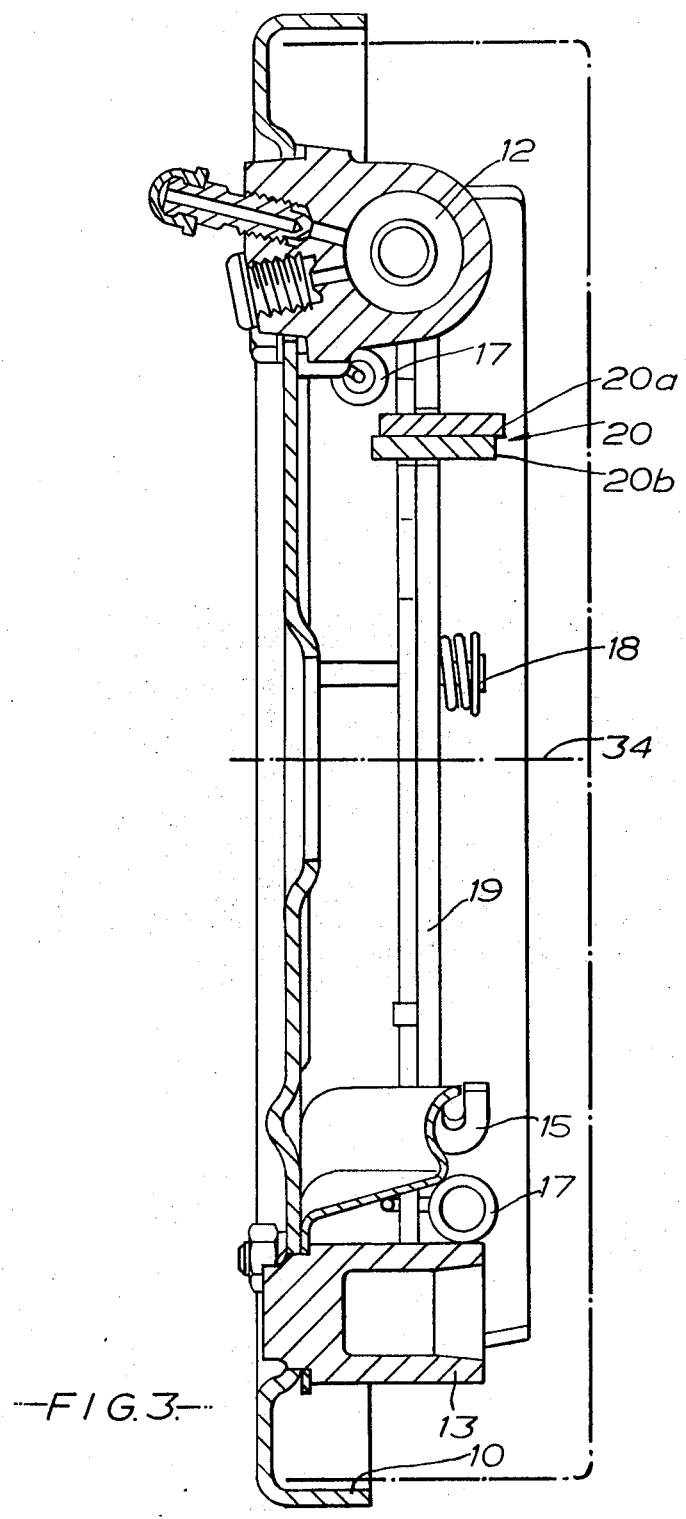
FIG. 3 is a section along line B—B of FIG. 1.

In FIGS. 1 to 3 there is illustrated an operating mechanism for an internal shoe drum brake. On a backing plate 10 intended to be non-rotationally attached to a vehicle there is mounted two arcuate friction elements 11, and actuator 12 for acting on an adjoining end of each of the two elements to urge said friction elements apart, an abutment member 13 for holding the other ends of said friction elements apart and an auxiliary brake-actuating means in the form of a hand brake linkage 15. Each of the friction elements 11 preferably incorporates a frictional lining material 16 mounted on a carrier platform 31 which is reinforced by a web 30 and the elements are joined by pull-off springs 17 acting to disengage them from the rotor or drum of the brake, (the drum and the shaft on which it is mounted are shown by chain dot lines 34 and FIG. 3). The friction elements are held on the backing plate by means of hold-down spring assemblies 18.

The hand brake linkage incorporates a lever 19 pivotally connected to the end of one of the frictional elements (preferably the one that trails in the normal direction of rotation of the brake drum) and adjacent the actuator 12 and this lever effectively broadens the web 30 of said element when the hand brake is applied. In FIG. 1, the lever 19 bears with a stop 36 against the edge of the friction element and the effective breadth of the web is at its minimum. A strut or stay member 20 bridges between this lever and the other friction element and thus effectively between the two elements but is so designed that the friction elements can freely move outwardly relatively to each other but the amount of withdrawal movement is limited. The strut or stay member 20 is provided with a peg 21 which engages in an aperture 22 in the lever 19. The other end of the strut or stay member has steps in its end profile and a pair of springs 23 anchored to the backing plate is provided to bias the strut or stay member pivotally about a pivotal axis, which is perpendicular to the axis of rotation of the drum and which is provided by the peg 21 and aperture 22 to bring progressively increasing sized steps into engagement with the edge of the web 30 of the friction element. The web 30 preferably has a notch 32 to give side ways support to the member. The steps are of saw-tooth or ratchet profile with a steep rise (preferably radial with respect to the pivot axis) and a slow decline on the trailing edge so that a larger step can only be engaged with the edge when the larger step will permit adequate clearance between the friction elements and the drum. The rise of each step should be equal to the travel of the friction elements relative to each other which is acceptable. During operation of the actuator, the elements will separate and the member will slide on the web but will be held against pivoting by abutment of the rise with the web. When wear is excessive the rise will run off the web and the member will pivot until the next rise is against the web.

On release of the actuator, the next rise will slide on the side of the web until the edge surface of the web is in contact with the next step on the decline thereof so providing clearance.

The strut or stay member 20 is conveniently made in two side-by-side parts 20a and 20b with steps which alternate in action so that a half notch (finer) compensation for wear can be achieved.

Figure 6:
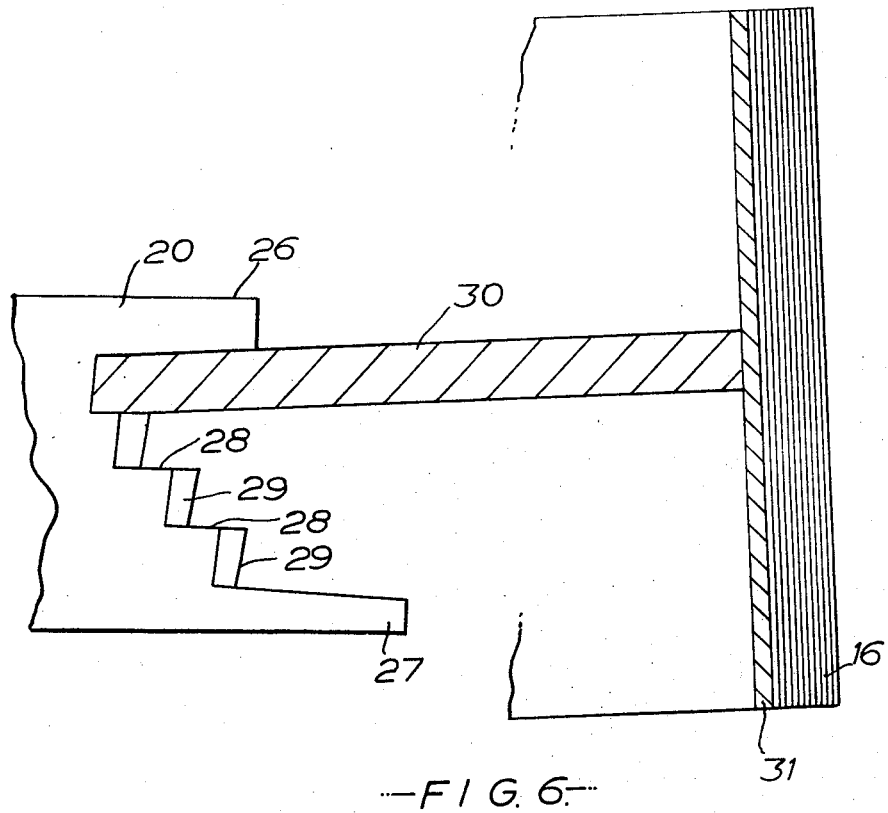
FIG. 6 is an enlargement of a detail of FIGS. 4 and 5.

The variant of FIG. 4 does not use a peg and aperture engagement. Instead the end 23a of the strut or stay member 20 is bifurcated, enages over the lever 19, and is held thereagainst by a spring 24 and there is a coil or hairpin-like spring 25 to move the strut or stay member pivotally. In the embodiment of FIG. 5 a finer adjustment of the mechanism is achieved by using two separate strut or stay members 20c and 20d arranged in contrast to the embodiment of FIGS. 1 to 3 to operate in scissor-like manner. The engagement of steps on these stay or strut members with the edge alternate so as to halve the size of the effective step. One of these strut or stay members is biassed by means of a coil or hair-pin spring 25a and the other by means of the coil or hair-pin spring 25b. These two Figures and FIG. 6 also illustrate that it is advisable to have an abutment 26 to prevent disengagement of the pawl and ratchet mechanism at the lower end and it is also advisable to have a prolonged step or abutment 27 to prevent the pawl and ratchet mechanism being over actuated. FIG. 6 illustrates the end profile of the strut or stay member extremely well. There is a steep rise 28 and then a sloping rear face or decline 29 so after the web 30 has ridden over a rise 28, it then slides down slightly on the slope 29. The web should either be chamfered so that it can so slide down as it should be thinner than the length of one step.

In all the embodiments, wear compensation occurs on service brake actuation i.e., extension of the actuator 12. This is desirable since often release of the service brake is accompanied by application of the auxiliary brake operating means. If the compensation occurred on the return stroke or release of the actuator then the compensation would not be available until the hand brake was ultimately released. There is another advantage of the construction of the invention over some prior compensating devices in that the compensation occurs under spring pressure. If the compensating device were to seize up then some previous known forms of adjustment might possibly prevent operation and/or disengagement of the brake.

It will be apparent that a like device could be used for disc brakes.

We claim:

1. An adjuster for brakes of the type having an actuator and opposed friction elements movable by said actuator against a rotatable member to apply the brakes, return bias means for biasing said elements away from said rotatable member, said adjuster comprising a strut extending between said elements, said strut having a pivotal connection at one end with one of said elements, said pivotal connection being constructed and arranged that said strut is movable relative to said element in a plane parallel to the axis of rotation of said rotatable member and about an axis lying in a plane normal to said axis of rotation, the other end of said strut engaging the other element and having steps on its end profile, and bias means urging the member so that the steps of said profile progressively engage said other elements so as to change the effective length of said strut as the friction elements wear due to the application of said brakes.

2. An operating mechanism according to claim 1 wherein the end profile is such that at least one of the steps has an initial rise which is greater than the mean height of the step so that said at least one step cannot engage on the other element until the step will permit a clearance between said rotatable member and said elements determined by the difference between said rise and said mean height.

3. An operating mechanism according to claim 1 wherein the step is of ratchet-like shape in that it has a rise followed by a slow decline.

4. An operating mechanism according to claim 3 wherein the surface of said other element that is engaged by the profiled end is chamfered at the same angle as the slow decline in such a way that the element seats on that step with its chamfered surface in contact with said decline.

5. An operating mechanism according to claim 3 wherein the length of a step is greater than the width of the surface of said other element that is engaged by the profiled end.

6. An operating mechanism according to claim 1 wherein each of the friction elements has a web extending in a plane perpendicular to the axis of rotation of the said rotatable member and wherein one of the webs can be effectively increased in radial depth by an auxiliary actuating means.

7. An operating mechanism according to claim 6 wherein the friction element corresponding to said one of the webs has a lever pivoted thereto, the lever also forming part of the auxiliary actuating means and on pivotal movement effectively increasing the radial depth of said one web.

8. An operating mechanism according to claim 7 wherein the pivotally mounted end of the strut is pivotal on said lever.

9. An operating mechanism according to claim 8 wherein the other web is notched to provide side-ways support to said strut where it engages with said web.

10. An operating mechanism according to claim 1 wherein said strut is made in two parts each with a stepped end profile.

11. An operating mechanism according to claim 10 wherein the two parts are joined together with the end profiles offset.

12. An operating mechanism according to claim 10 wherein the two parts are biassed for movement in opposite senses so as to operate in scissors-like manner, the steps on one part being different from those on the other.

* * * * *